Z. B. COES.
LATHE.
APPLICATION FILED MAR. 23, 1908.
948,467.
Patented Feb. 8, 1910.
8 SHEETS—SHEET 6.
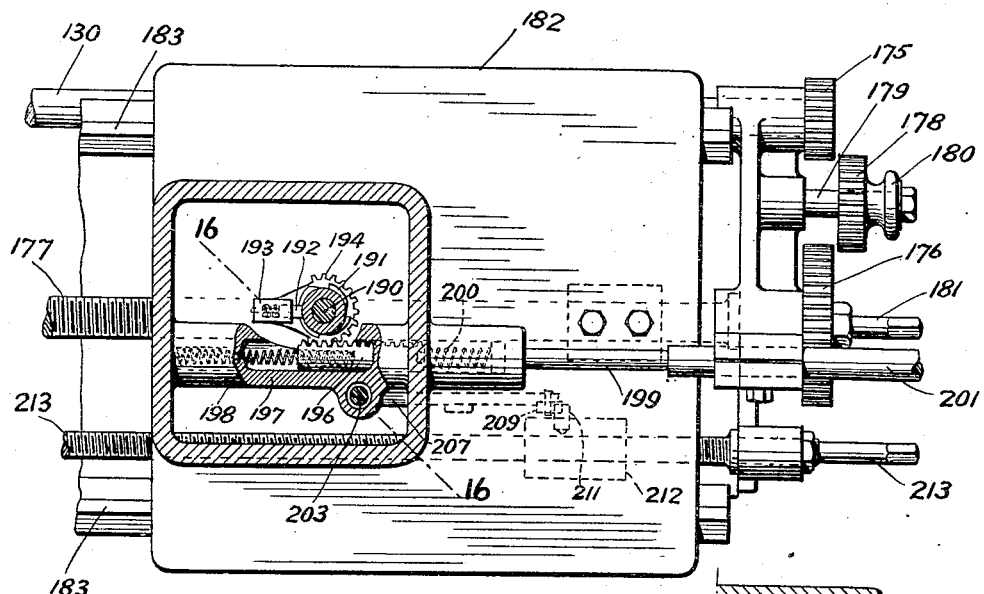
FIG. 14.
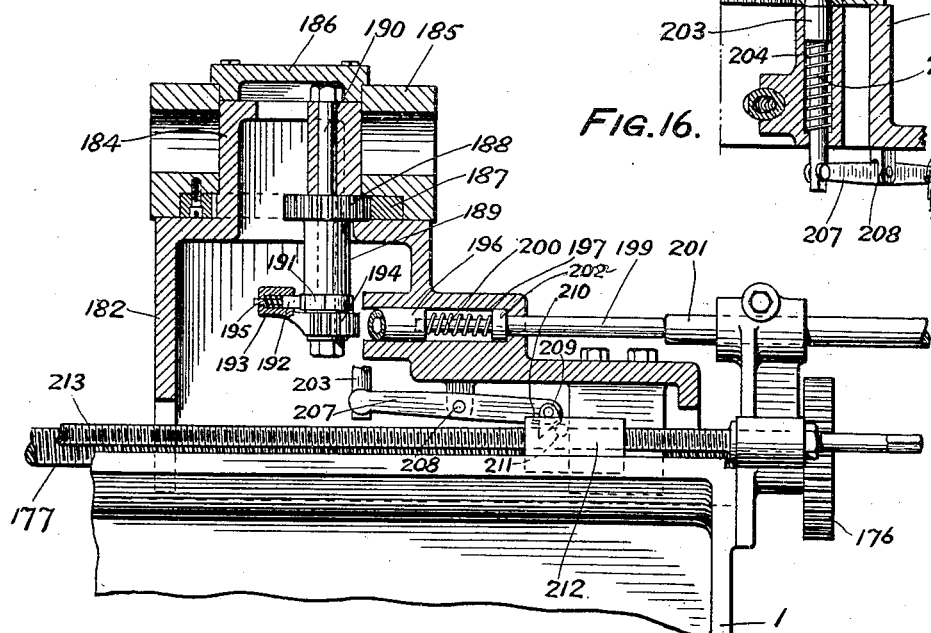
FIG. 16.
FIG. 15.
WITNESSES:
INVENTOR
Z. B. Coes
BY
C. N. Butler
ATTORNEY.

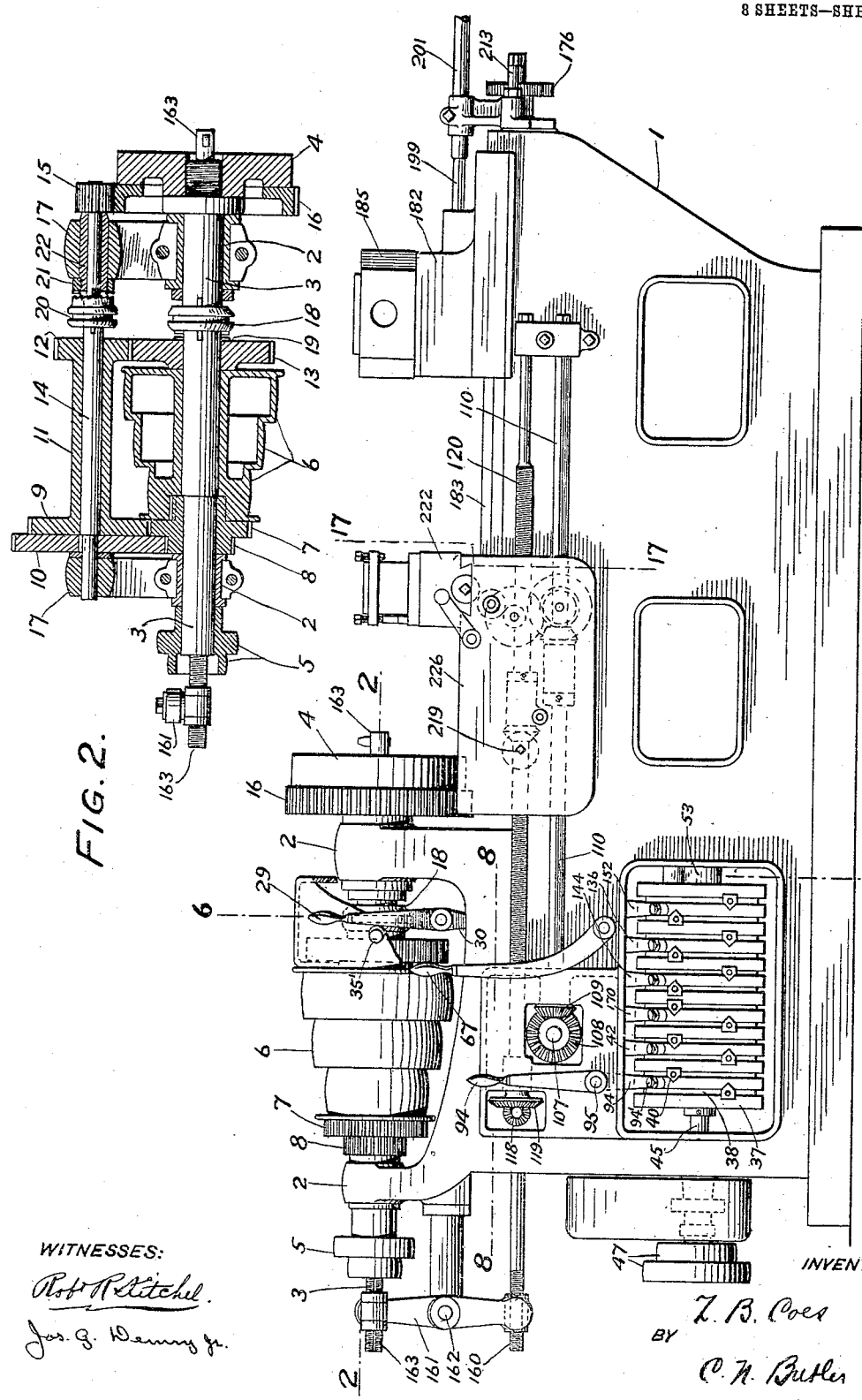

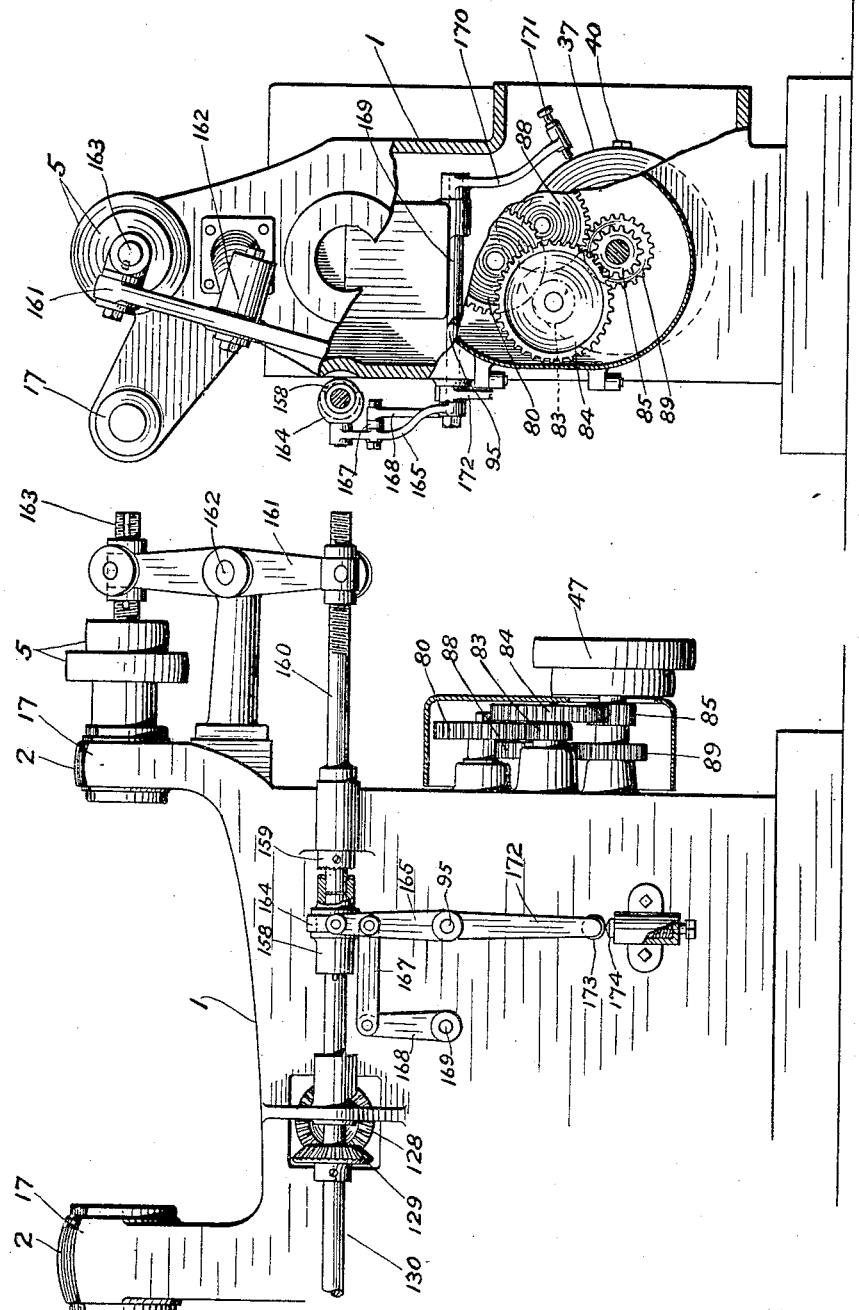

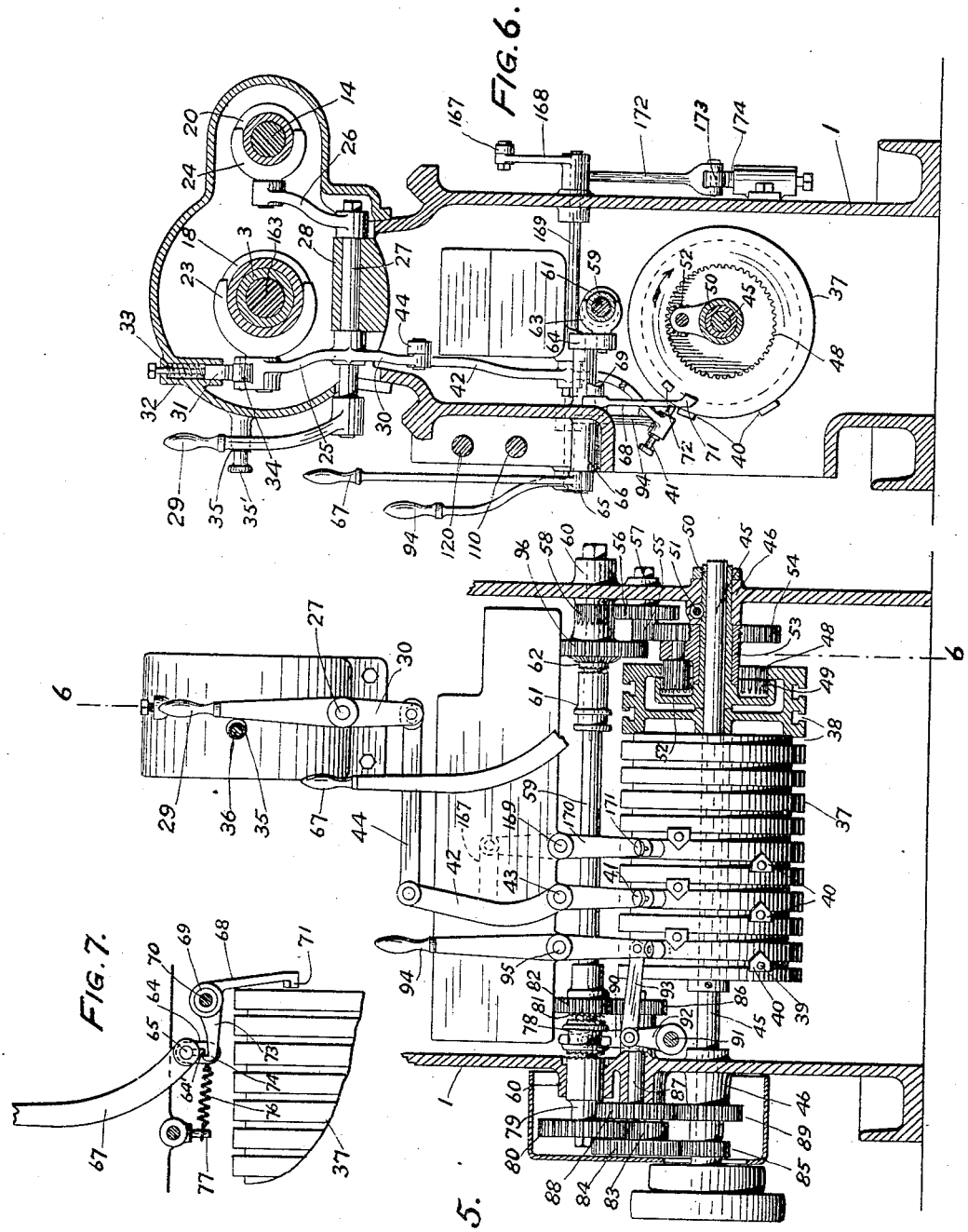

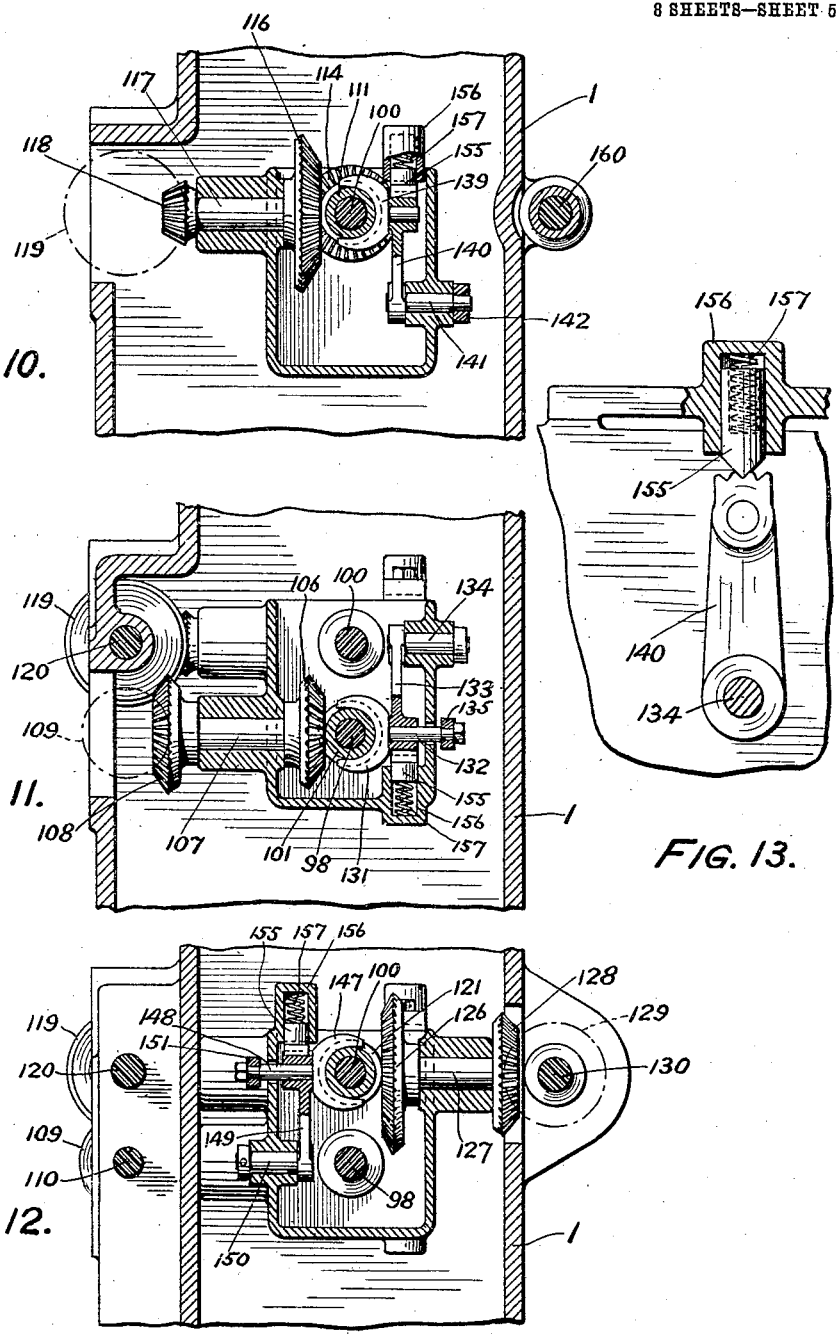

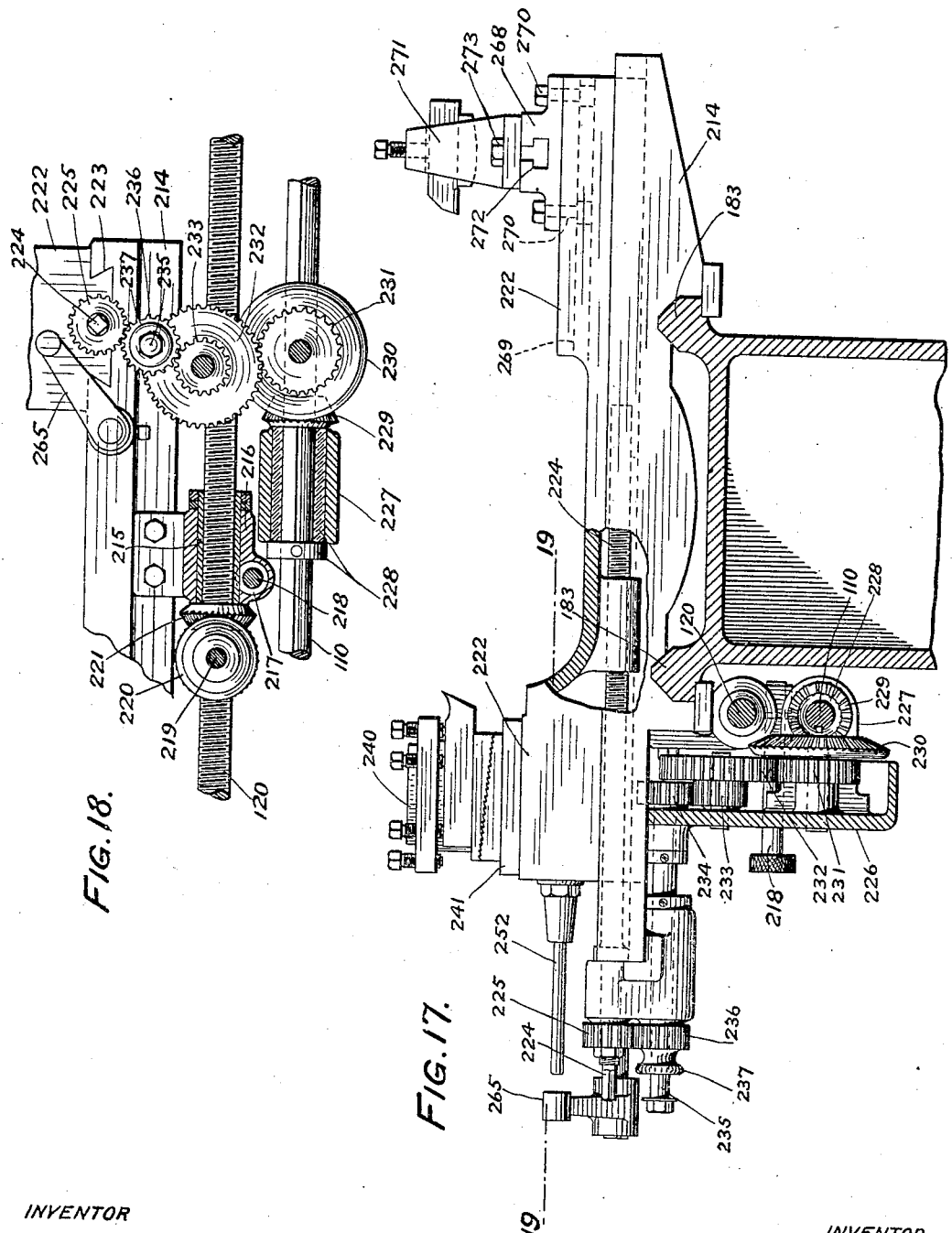

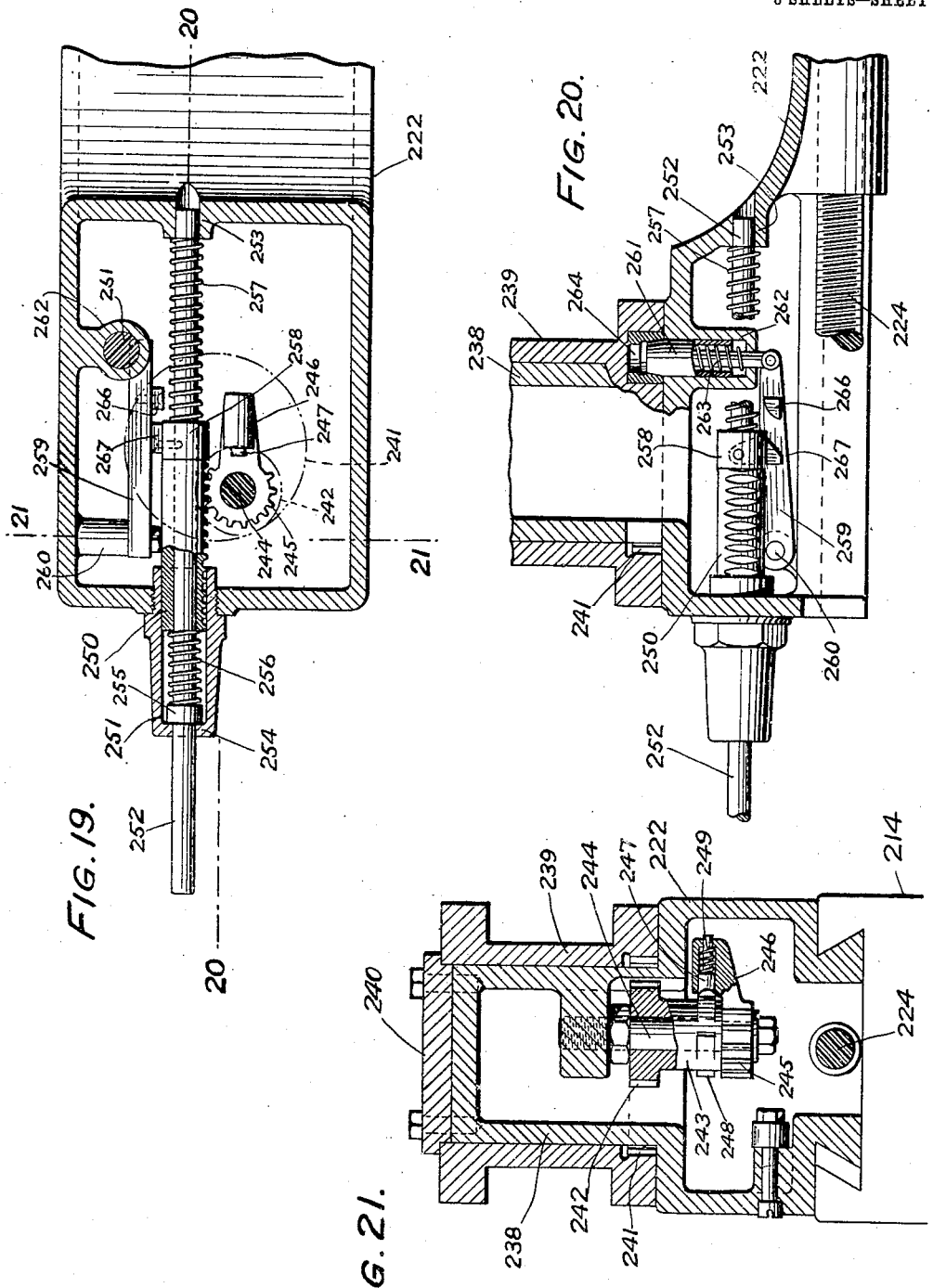

UNITED STATES PATENT OFFICE.

ZORESTER B. COES, OF PHILADELPHIA, PENNSYLVANIA, ASSIGNOR TO EDWIN HARRINGTON, SON & COMPANY, INC., OF PHILADELPHIA, PENNSYLVANIA, A CORPORATION OF PENNSYLVANIA.

LATHE.

948,467.  Specification of Letters Patent.  Patented Feb. 8, 1910.

Application filed March 23, 1908.  Serial No. 422,747.

*To all whom it may concern:*

Be it known that I, ZORESTER B. COES, a citizen of the United States, residing at Philadelphia, in the county of Philadelphia and State of Pennsylvania, have invented certain Improvements in Lathes, of which the following is a specification.

This invention is a turret lathe of improved efficiency, capacity and facility of operation.

It comprises improved means for driving the work holding mechanism and for mounting, feeding and controlling the tool holding mechanisms.

The characteristic features of the improvements will fully appear from the following description and the accompanying drawings in illustration thereof.

Figure 8:
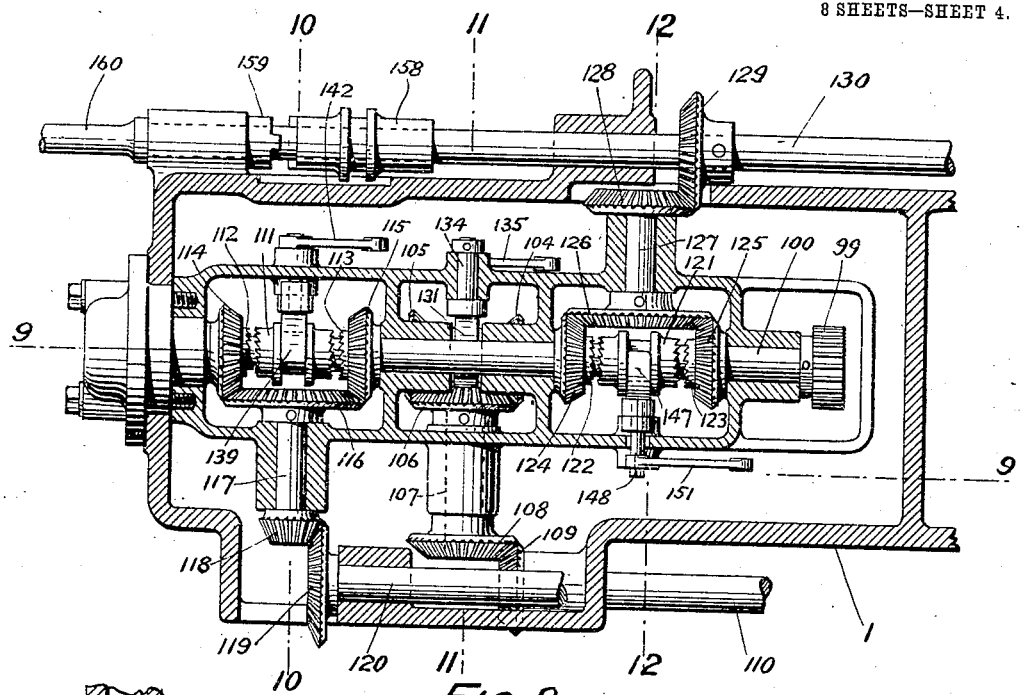
Figure 9:
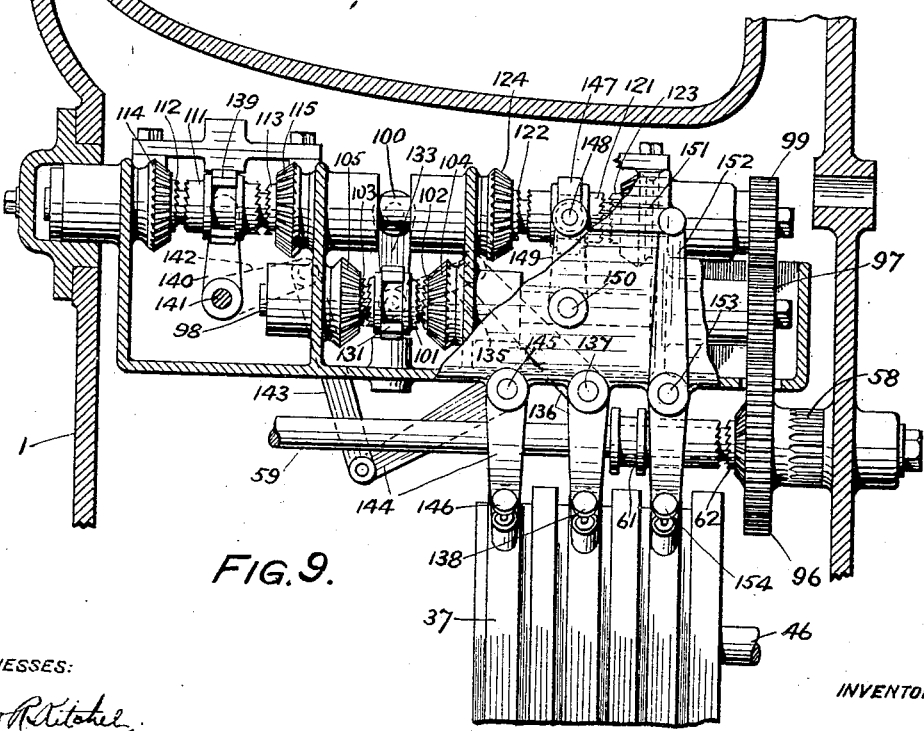

In the drawings, Figure 1 is a side view of a lathe embodying the improvements; Fig. 2 is a sectional view taken on the line 2—2 of Fig. 1; Fig. 3 is a rear sectional elevation of parts of the head of the lathe; Fig. 4 is an end sectional elevation of parts of the head of the lathe; Fig. 5 is a front sectional elevation of parts of the head of the lathe illustrating controlling mechanism; Fig. 6 is a partial sectional view taken on the line 6—6 of Figs. 1 and 5; Fig. 7 is a view of mechanism for holding and releasing a driving clutch; Fig. 8 is a sectional view taken on the line 8—8 of Fig. 1 illustrating parts of the controlling mechanism; Fig. 9 is a sectional view taken on the line 9—9 of Fig. 8; Fig. 10 is a sectional view taken on the line 10—10 of Fig. 8; Fig. 11 is a sectional view taken on the line 11—11 of Fig. 8; Fig. 12 is a sectional view taken on the line 12—12 of Fig. 8; Fig. 13 is a sectional elevation illustrating details of the clutch operating mechanism shown in Figs. 10, 11 and 12; Fig. 14 is a sectional plan view of the tail of the lathe and a turret thereon; Fig. 15 is a vertical longitudinal sectional view showing details of the mechanism illustrated in Fig. 14; Fig. 16 is a sectional view taken on the line 16—16 of Fig. 14; Fig. 17 is a broken sectional view taken on the line 17—17 of Fig. 1, showing the longitudinally and transversely movable tool carriage and turret mechanism; Fig. 18 is a sectional elevation showing a view of mechanism for operating the longitudinally and transversely movable tool carriage and turret mechanism; Fig. 19 is a sectional view taken on the line 19—19 of Fig. 17; Fig. 20 is an irregular sectional view taken on the line 20—20 of Fig. 19; and Fig. 21 is an irregular partial sectional view taken on the line 21—21 of Fig. 19.

As shown in Figs. 1, 2, 3, and 4 of the drawings, the lathe bed 1 has on the head thereof the bearings 2 in which is journaled the live spindle 3 having the face plate or work holder 4 and the cone pulley 5 fixed thereto. A cone pulley 6 and differential pinions 7 and 8, all rigidly fixed together, are journaled on the spindle 3, the pinions engaging the respective spur gears 9 and 10. The gear 9 is fixed to one end of a hollow shaft 11 having a pinion 12 fixed to the other end and engaging a spur gear 13 journaled on the spindle 3. The gear 10 is fixed to one end of a shaft 14 having a pinion 15 loosely connected to the other end thereof and engaging a spur gear 16 fixed to the face plate 4, the shaft 14 being revolubly supported in bearings 17 and providing a journal for the hollow shaft 11. A clutch sleeve or collar 18 is splined on the spindle 3 so that it can be thrown into and out of engagement with the clutch mechanism 19 on the gear 13, and a clutch sleeve or collar 20 is splined on the shaft 14 so that it can be thrown into and out of engagement with the clutch mechanism 21 fixed by the sleeve 22 to the pinion 15, the sleeve being journaled in a bearing 17 and on the shaft 14. With the clutch collar 20 disengaged and the collar 18 clutched to the gear 13, the spindle 3 is driven from the cone pulley 6, through the pinion 7, the gear 9, the shaft 11, the pinion 12 and the gear 13. With the clutch collar 18 disengaged and the collar 20 clutched to the pinion 15, the spindle 3 is driven at a slower speed from the cone pulley 6, through the pinion 8, the gear 10, the shaft 14, the pinion 15 and the gear 16. Means are thus provided for effecting different speeds or revolution of the work holder; and as the power for effecting the slow speed is applied directly to the gear fixed to the work holder, the latter revolves with greater steadiness than where it is driven by torsion transmitted through a spindle.

As shown in Fig. 6 the collars 18 and 20 are engaged by the respective forks 23 and 24 on arms 25 and 26 which are fixed to a shaft 27 journaled in the bearing 28. This shaft is rocked manually, by a lever 29, or automatically, through an arm 30 fixed thereon. The full throw required in either direction for securing a positive clutching engagement is effected by the use of a bevel faced bolt 31, which is adapted for reciprocation vertically in the way 32 and is pressed down by the spring 33 against the roller 34 journaled in the top of the arm 25. Both clutches are held out of engagement by turning the eccentric 35 by the knob 35' on the supporting arbor 36 so that its highest part will engage the arm 29 when the roller 34 has just passed the point of the bolt, the arm 25 being held from movement in one direction by the eccentric and in the other by the bolt. The automatic operation is effected by means of a revolving drum 37 having the under cut peripheral channels 38 by which bolts 39 hold cams 40 so that they can be adjusted to and fixed in the positions desired; the corresponding cams striking the pin 41 in the lower arm of a lever 42 which rocks on a fulcrum 43 and has its upper arm connected by the link 44 with the arm 30.

The drum 37 is revoluble on its supporting shaft 45 which is revolubly supported in the bearings 46. The shaft is revolved by connecting the cone pulley 47 fixed thereon with the cone pulley 5 fixed on the spindle 3. The drum is revolved by means of its internal gear 48, a stationary internal gear 49 on a sleeve 50 (held on the shaft 45 and in the bearing 46 by a key 51), and a planetary pinion 52 (journaled on a sleeve 53 which is journaled on the sleeve 50), the relative number of teeth on the respective gears 48 and 49 differing as required by the desired speed. To revolve the sleeve 53 carrying the planetary pinion, it has fixed thereon a spur gear 54, a pinion 55 engages the gear 54 and is driven by the spur gear 56 fixed thereto and journaled on the arbor 57, and a pinion 58 normally loose on the shaft 59 engages the spur gear 56; the shaft 59 being revoluble in the bearings 60 and having the clutch sleeve 61 splined thereon so that it can be engaged with the clutch collar 62 fixed to the pinion 58. The clutch sleeve 61 is thrown by an engaging fork 63, carried by a crank arm 64 fixed on a shaft 65, the latter being rocked in the bearing 66 by the lever 67. To automatically release the clutch, an arm 68 is fixed to a sleeve 69 which is journaled on the shaft 70, the arm having the lug 71 disposed in the path of the lug 72 on the end of the drum; an arm 73, which is fixed to the arm 68 and provided with the hook 74, engages the lug 64' fixed to the crank 64; and a spring 76, fixed to the crank arm and to the anchor 77 acts to rock the crank when the hook is disengaged by the contact of the lugs 71 and 72. (Figs. 6 and 7.)

The shaft 59 is revoluble at different speeds by engaging it with different gear trains through the double faced clutch collar or sleeve 78 splined thereon so that it may be thrown into engagement with the clutch sleeve 79 fixed to the spur gear 80 or with the clutch collar 81 fixed to the spur gear 82, the gears 80 and 82 being normally loose on the shaft and fixed thereto through the engagement of the clutch mechanism. The gear 80 is driven by a pinion 83 fixed to the journaled spur gear 84, and the gear 84 is driven by the pinion 85 fixed on the revoluble shaft 45. The gear 82 is driven by the pinion 86 fixed by the journaled shaft 87 to the gear 88, and the gear 88 is driven by a pinion 89 fixed on the shaft 45. The clutch collar 78 is shifted by an engaging fork 90 fixed to a rock shaft 91 and an arm 92 fixed on this shaft is connected by a link 93 with a lever 94 having a fulcrum 95; the lever being thrown to engage and disengage the clutch manually, or automatically by the engagement of cams 40 on the drum with a pin 94' in the foot of the lever.

As shown in Figs. 5 and 9, a spur gear 96 is fixed to the pinion 58 and revolved by clutching it to the shaft 59 through the parts 61 and 62. This gear engages a gear 97 fixed on the revoluble shaft 98 and the gear 97 engages a gear 99 fixed on a revoluble shaft 100. The shaft 98 has the double faced clutch collar 101 splined thereon so that it can be thrown alternately into and out of engagement with the clutch collars 102 and 103 on the respective bevel pinions 104 and 105 normally loose on the shaft. The pinions 104 and 105 engage the bevel pinion 106 fixed by the journaled shaft 107 to the bevel pinion 108, and the latter engages the bevel pinion 109 fixed to the journaled shaft 110. The shaft 100 has the double faced clutch collar or sleeve 111 splined thereon so that it can be thrown alternately into and out of engagement with the clutch collars 112 and 113 fixed to the respective bevel gears 114 and 115, the latter being normally loose on the shaft. The pinions 114 and 115 engage a bevel gear 116 fixed by a journaled shaft 117 to a bevel pinion 118, and the latter engages a bevel gear 119 fixed on the journaled shaft 120. The shaft 100 also has the double faced clutch sleeve or collar 121 splined thereon so that it can be thrown alternately into and out of engagement with the clutch collars 122 and 123 fixed to the respective bevel pinions 124 and 125 which are normally loose on the shaft. The pinions 124 and 125 engage a bevel gear 126 fixed by a journaled shaft 127 to a bevel gear 128 and the latter engages a bevel gear 129 fixed on a journaled shaft 130. The collar 101 is engaged by a fork 131 having a shank 132 connected to an arm 133 which swings on a bearing 134. A link 135 connects the shank 132 with one arm of a bell crank lever 136 having a fulcrum 137, the other arm of the lever carrying a pin 138 adapted for engagement by cams 40 to shift the mechanisms which throw the clutch collar. A fork 139 engages the clutch collar 111 and is engaged to an arm 140 fixed to the rock shaft 141, the latter having an arm 142 fixed thereto and connected by a link 143 to a bell crank lever 144 which rocks on the fulcrum 145, the bell crank lever being provided with a pin 146 adapted for engagement by cams 40 to shift the clutch collar through the connecting mechanism. A fork 147 engages the clutch collar 121 and a shank 148 on the fork is engaged by an arm 149 rocking on a fulcrum 150. A link 151 connects the shank 148 with a lever 152 which rocks on a fulcrum 153, the lever carrying a pin 154 adapted to be engaged by cams 40 for operating the mechanism which throws the clutch collar. Each of the arms 133, 140 and 149 has its outer end serrated for the engagement of a bevel faced bolt 155 which reciprocates in a way 156 and is pressed outward to engage the end of the arm by a spring 157.

As shown in Figs. 3, 4, and 5, a clutch sleeve 158, splined on the shaft 130, is adapted for engaging the clutch sleeve 159 fixed on the journaled shaft 160. The shaft 160 has a threaded engagement with one end of the lever 161 rocking on the fulcrum 162, the other end of the lever being clamped at the desired position on a boring and facing bar 163 (Figs. 1 and 2), which passes through the hollow spindle 3 and is moved longitudinally on rocking the lever 161 by revolving the shaft 160. The sleeve 158 is thrown by an engaging fork 164 on an arm 165, which is fulcrumed on the shaft 95, and a link 167 connects the fork with an arm 168 fixed on the rock shaft 169. An arm 170, fixed on the shaft 169, carries a pin 171 adapted to be engaged by cams 40, by which the clutch sleeve 158 is thrown through the intermediate mechanism described.

An arm 172 is fixed to the shaft 95 and carries a roller 173 which is engaged by a bevel faced spring pressed bolt 174 to rock the shaft and effect a complete throw of the clutch sleeve 78 through the intermediate mechanism, previously described.

As shown in Figs. 14, 15 and 16, the shaft 130 has fixed thereon the pinion 175 which can be engaged to and disengaged from the spur gear 176 fixed on the journaled lead screw 177 by the idler gear 178, the latter being movable along its journal 179 by means of the button 180 to throw it into and out of engagement. A stem 181 on the end of the screw 177 provides means for turning the latter by means of a wrench when the pinion 178 is disengaged. The lead screw 177 engages and moves the rear turret slide or carriage 182 along the ways 183 extending longitudinally of the lathe bed. This slide has the hollow cylindrical post 184 on which the turret 185 is held by the detachable cap 186. The turret is revolved by means of a cylindrical rack 187 fixed thereto, which is engaged by a pinion 188 fixed to a hub 189, the hub and pinion being journaled on a stem 190 fixed within the post. A ratchet 191 on the hub 189 is engaged by a pawl 192 carried by an arm 193 on a segmental pinion 194 which is journaled on the stem 190, the pawl being held to its work by the spring 195. A hollow rack 196, adapted to reciprocate in a way 197 of the slide 182, engages the pinion 194. The rack is forced back in its way by a spring 198 disposed therein, and is forced forward in the way by a rod 199 and a spring 200 thereon which engage the rack and are held by the contact of the rod 199 with the fixed rod 201 as the turret slide approaches the limit of its backward movement. The retraction of the rod 199 in its way is effected by the spring 200 and limited by the collar 202 when the carriage has moved forward. The time of operation may be varied by adjusting the position of the rod 201. The turret 185 is locked by the engagement of a bolt 203, adapted to reciprocate in a way 204 of the slide, in a socket 205 in a part of the turret as the rack 187. The bolt is moved into engagement by the spring 206 and is withdrawn by a lever 207 pivoted thereto and having a fulcrum 208 on the slide. The lever is rocked to withdraw the bolt, as the slide approaches the limit of its rearward movement, by contact of the lever's pivoted cam 209 (adapted to swing backward and held against movement forward past the vertical by the stop 210) with a pin 211 on a block 212, the latter being adjustable in position by means of the journaled screw 213.

It will be understood that as the slide 182 is fed forward by the lead screw 177 the turret is held locked by the bolt 203, and when the slide is moved back so that the lever 207 is rocked to withdraw the bolt 203, the rod 199 is held by the rod 201 so that the rack 196 is caused to rotate the pinion 194, which acts through the ratchet mechanism to revolve the hub 189 and cause the pinion 188 to revolve the turret to the position desired, the locking of the turret in the new position being automatically effected by the bolt, and the rack with the shaft engaging it being restored by the engaging springs when the slide is fed forward.

The principal function of the spring 200 is to furnish an elastic medium between the rod 199 and the turret revolving mechanism so that in case the lock bolt should be seated before the slide has completed the backward movement, owing to faulty setting of cams 40, the spring would prevent breakage. It will be stiff enough to revolve the turret when extended after inertia has been overcome.

As shown in Figs. 17 to 21 inclusive, a slide or carriage 214 is movable on the longitudinal ways 183 by the revolution of the lead screw 120 when engaged by a sleeve nut 215, the sleeve nut being fixed in a bracket 216 on the slide 214 by a conventional key 217 moved by a bolt 218. On releasing the key so that the sleeve nut can turn in the bracket, the slide can be moved manually by a wrench applied to the journaled stem 219, which has a bevel pinion 220 fixed thereto and engaging a bevel pinion 221 fixed to the sleeve.

A slide or carriage 222 is movable along the way 223 of the slide 214 transversely to the axis of the lathe, the movement being effected by a lead screw 224 journaled in the slide 214 and having a threaded engagement with the slide 222. The lead screw 224 has fixed thereon a pinion 225 which is operated from the revolving shaft 110 through a gear train carried by an apron 226 depending from the slide 214; a bracket 227 on the apron having journaled therein a sleeve 228 to which is fixed a bevel pinion 229; the pinion 229 drives a bevel gear 230 and the pinion 231 fixed thereto; the pinion 231 drives a spur gear 232 and a pinion 233 fixed thereto, the pinion 233 drives the pinion 234 connected by the journaled shaft 235 to a pinion 236 splined thereon, and the pinion 236 drives the pinion 225. The pinion 236 has a button 237 thereon by which it can be moved along its shaft and disengaged from the pinion 225, when a wrench can be applied to the end of the lead screw 224 and the slide 222 moved thereby.

The slide 222 has thereon the hollow cylindrical post 238 on which revolves a turret 239 held in place by a cap 240 bolted to the post. The turret has an internal rack 241 which is engaged by a pinion 242 on a hub 243 having the journal 244 fixed within the post. A segmental pinion 245, revoluble on the journal 244, is provided with the arm 246 having connected thereto the reciprocating pawl 247 which engages ratchet teeth 248 on the hub 243, the pawl being flexibly held to its work by the spring 249. The pinion 245 is engaged by a hollow rack 250 which reciprocates in a way 251 and on a rod 252 moving in bearings 253 and 254. A collar 255 fixed on the rod makes contact with the bearing 254 to limit the movement and a spring 256 on the rod between the collar and the rack provides an elastic bearing for the latter. A spring 257 on the opposite end of the rod, between the collar 258 fixed thereon and the bearing 253, keeps it in its normal position with the collar 255 in contact with the bearing 254. A lever 259, having the fulcrum 260 on the slide 222, has pivoted thereto a bolt 261 which reciprocates in the way 262 in the slide and is elevated by the spring 263 to engage the socket 264 in and lock the turret 239.

When the slide 222 is moved back on the slide 214 and the rod 252 engages the stop 265, a lug 266 on the lever 259 is caused to strike a cam 267 pivoted to the collar 258, the cam being held so that on making contact with the lug it will depress the lever and withdraw the bolt. Immediately the rack acts through the intermediate mechanism to revolve the turret, which is automatically locked in the advanced position by the bolt. When the slide 222 is fed forward the cam swings out of the way of the lug and the springs restore the rack and rod to their normal position. The slide 222 also holds the block 268 which is movable on the longitudinal ways 269 and fixed by the bolts 270, and the block carries the tool holder 271 movable along the way 272 transverse to the way 269, the tool holder being engaged to the block by the bolts 273. The tool holders carried by the slide 222 are thus adjustable in their relation to each other and are movable both longitudinally and transversely with relation to the working axis of the lathe.

Having described my invention, I claim:

1. In a lathe, a journaled spindle, a gear fixed thereto, a second gear engaging said gear, driving mechanism, means for engaging and disengaging said second gear and driving mechanism, a third gear normally loose on said spindle, means for fixing said third gear to said spindle, a fourth gear engaging said third gear, and means whereby said fourth gear is revolved by said driving mechanism to revolve said third gear and shaft.

2. In a lathe, a journaled spindle, a work holder and a gear fixed thereto, a second gear engaging said gear, driving mechanism, a clutch for engaging and disengaging said second gear and driving mechanism, a third gear normally loose on said spindle, a clutch for engaging and disengaging said third gear and spindle, and means comprising a fourth gear for connecting said third gear and driving mechanism.

3. In a lathe, a journaled spindle, a gear carried by said spindle, a second gear engaging said gear, mechanism comprising a third gear for driving said second gear, a fourth gear carried by said spindle, a fifth gear engaging said fourth gear, mechanism comprising a sixth gear for driving said fifth gear, gear mechanism on said spindle for engaging said third and sixth gears, means for revolving said gear mechanism, and means whereby said spindle is revolved alternately through the first and fourth named gears.

4. In a lathe, a journaled spindle, a work holder and a gear fixed to said spindle, a second gear on said spindle, a third gear engaging said first gear, a fourth gear engaging said second gear, a pulley revoluble on said spindle, and mechanisms whereby said pulley revolves said spindle alternately through said third and fourth gears.

5. In a lathe, a journaled spindle, a work holder and a gear fixed to said spindle, a gear loose on said spindle, clutching mechanism for fixing said loose gear to said spindle, a journaled shaft, a gear loose with relation to said shaft and engaging said gear first named, clutching mechanism for fixing together said shaft and loose gear last named, a gear fixed to said shaft, gear mechanism loose on said spindle and engaging said gear fixed to said shaft, a journaled pair of connected gears, one of said pair of gears being engaged by said gear mechanism and the other engaging said second named gear, and means for revolving said gear mechanism.

6. In a lathe, a journaled spindle, a pulley journaled on said spindle, differential gears fixed to and revolved by said pulley, independently revoluble gears engaged by said differential gears, and mechanisms each comprising a pair of gears and a clutch for connecting each of said independently revoluble gears to said spindle.

7. In a lathe, a journaled spindle, a pulley journaled on said spindle, gear mechanism fixed to said pulley, a journaled shaft, a gear fixed to said shaft and engaging said gear mechanism, a gear loose on said shaft and engaging said gear mechanism, a gear fixed to said spindle, a gear loose with relation to said shaft and engaging said gear fixed to said spindle, means for clutching said last named loose gear to said shaft, a gear loose on said spindle, means for clutching said last named gear to said spindle, and a gear engaging said last named gear and fixed to said gear loose on said shaft.

8. In a lathe, a journaled spindle, a work holder fixed to said spindle, a gear fixed to said spindle, a gear loose on said spindle, a journaled shaft, a gear loose with relation to said shaft and engaging said gear fixed to said spindle, clutching mechanism for engaging said spindle to said gear loose thereon, clutching mechanism for engaging said shaft to said gear loose with relation thereto, a rock shaft, mechanisms operated by said rock shaft for operating said clutching mechanism, and means for operating said rock shaft.

9. In a lathe, a journaled spindle, a work holder fixed to said spindle, a gear fixed to said spindle, a gear loose on said spindle, a journaled shaft, a gear loose with relation to said shaft and engaging said gear fixed to said spindle, clutching mechanism for engaging said spindle to said gear loose thereon, clutching mechanism for engaging said shaft to said gear loose with relation thereto, and mechanisms for automatically operating said clutching mechanism.

10. In a lathe, a work holder, mechanisms for operating said work holder at different speeds, clutching devices for engaging said mechanisms alternately with said work holder, a rock shaft, arms fixed on said rock shaft and connected respectively with said clutching devices, a revolving drum, and mechanism whereby said drum operates said rock shaft.

11. In a lathe, a plurality of working lathe elements and mechanisms adapted for moving and controlling the movements of said elements, each of said mechanisms comprising a clutch, a rocking arm for holding said clutch engaged, a second rocking arm connected to said rocking arm first named, a revolving drum, and means whereby said drum operates said arms.

12. In a lathe, controlling mechanism comprising a drum, a gear on said drum, a stationary gear, a planetary gear engaging said gears to revolve said drum, means for revolving said planetary gear, a lathe element, mechanism for operating said lathe element, and means controlled by said drum for controlling said mechanism.

13. In a lathe, controlling mechanism comprising a shaft, a revoluble drum on said shaft, a gear on said drum, a stationary gear, a planetary gear revoluble about said shaft and engaging said gears aforesaid, gearing for operating said planetary gear, a revoluble shaft, a gear normally loose with relation to said revoluble shaft and engaging said gearing, means for clutching said loose gear to said revoluble shaft, and means controlled by said drum whereby said clutch is disengaged.

14. In a lathe, a revoluble shaft, a drum on said shaft, a second revoluble shaft, means whereby said first shaft revolves said second shaft, a lathe element, mechanism whereby said second shaft operates said lathe element, and means whereby said drum controls the operation of said mechanism.

15. In a lathe, a spindle, a work holder fixed to said spindle, mechanism for revolving said spindle and holder by power applied to said spindle and transmitted to said holder, and mechanism for revolving said spindle and holder by power applied to said holder and transmitted to said spindle.

16. In a lathe, a spindle, a work holder fixed to said spindle, mechanism whereby power is communicated to said holder through said spindle, mechanism whereby power is communicated to said holder independently of said spindle, and means for alternately operating said mechanisms.

In witness whereof I have hereunto set my name this 17th day of March, A. D. 1908, in the presence of the subscribing witnesses.

ZORESTER B. COES.

Witnesses:
 ROBERT JAMES EARLEY,
 JOS. Z. DENNY, Jr.